(12) United States Patent
Halfmann et al.

(10) Patent No.: US 7,699,327 B2
(45) Date of Patent: Apr. 20, 2010

(54) WHEEL SUSPENSION

(75) Inventors: Edmund Halfmann, Neuss (DE); Jorg Weshendorff, Witten (DE)

(73) Assignee: Ford Global Technologies, LLC, Dearborn, MI (US)

( * ) Notice: Subject to any disclaimer, the term of this patent is extended or adjusted under 35 U.S.C. 154(b) by 325 days.

(21) Appl. No.: 11/944,941

(22) Filed: Nov. 26, 2007

(65) Prior Publication Data

US 2008/0122194 A1    May 29, 2008

(30) Foreign Application Priority Data

Nov. 24, 2006  (DE) ................. 10 2006 055 565

(51) Int. Cl.
*B60G 3/04* (2006.01)
(52) U.S. Cl. .............. 280/93.512; 280/124.125; 280/124.134; 280/124.152; 280/124.107
(58) Field of Classification Search .......... 280/124.125, 280/124.134–124.137, 124.152, 93.511, 280/93.512, 124.107
See application file for complete search history.

(56) References Cited

U.S. PATENT DOCUMENTS

| 825,329 | A | * | 7/1906 | Lemp | ............... | 280/93.512 |
|---|---|---|---|---|---|---|
| 1,054,015 | A | * | 2/1913 | McGahee | ............... | 280/93.512 |
| 2,169,969 | A | * | 8/1939 | Allison | ............... | 267/189 |
| 2,299,935 | A | * | 10/1942 | Slack et al. | ............... | 280/124.134 |
| 3,819,202 | A | | 6/1974 | Castoe | | |
| 4,875,703 | A | | 10/1989 | Murakami | | |
| 5,362,092 | A | * | 11/1994 | Schote et al. | ............... | 280/124.134 |
| 5,368,326 | A | * | 11/1994 | Turck et al. | ............... | 280/124.102 |
| 6,076,840 | A | * | 6/2000 | Kincaid et al. | ............... | 280/124.107 |
| 6,254,114 | B1 | * | 7/2001 | Pulling et al. | ............... | 280/93.511 |
| 2004/0201193 | A1 | * | 10/2004 | Larson et al. | ............... | 280/93.512 |
| 2005/0242539 | A1 | * | 11/2005 | Matthew | ............... | 280/93.511 |

FOREIGN PATENT DOCUMENTS

| DE | 3803802 C1 | 6/1989 |
|---|---|---|
| DE | 3909942 A1 | 9/1990 |
| DE | 19805810 A1 | 8/1998 |
| DE | 19805810 B4 | 8/1998 |
| DE | 19720639 A1 | 11/1998 |
| DE | 10108686 A1 | 9/2002 |
| EP | 0312711 A2 | 7/1988 |
| EP | 0312711 A3 | 7/1988 |
| EP | 0312711 B1 | 7/1988 |

* cited by examiner

*Primary Examiner*—Ruth Ilan
(74) *Attorney, Agent, or Firm*—Fredrick Owens

(57) ABSTRACT

The invention relates to a wheel suspension, which has at least one transverse link and one wheel carrier. The wheel carrier has a connecting element, through which a bolt extends, for connecting to the transverse link. The connecting element has a stop on a limb which is assigned to a bolt head, with the bolt head having a counterstop which corresponds to the stop.

10 Claims, 2 Drawing Sheets

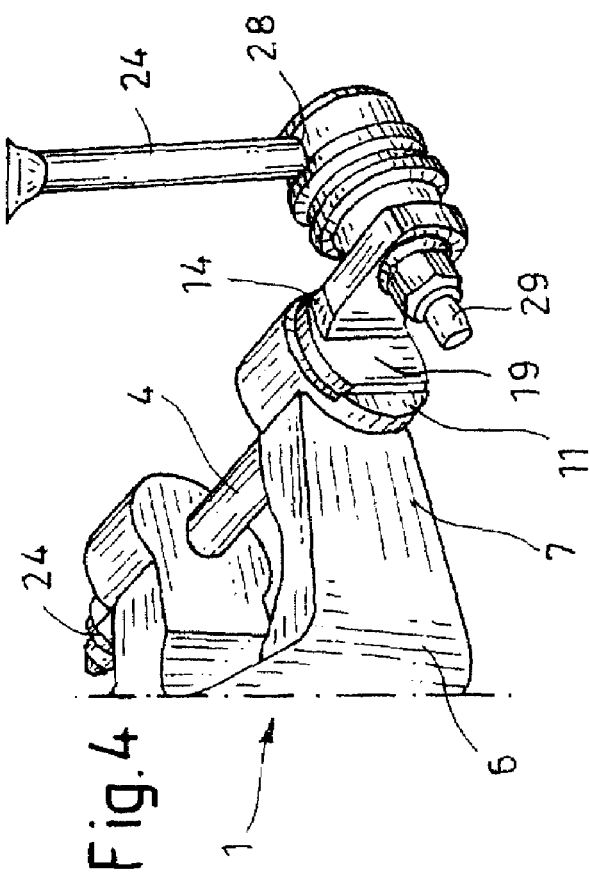
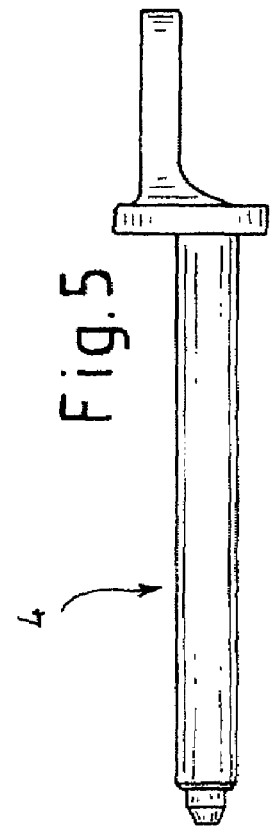
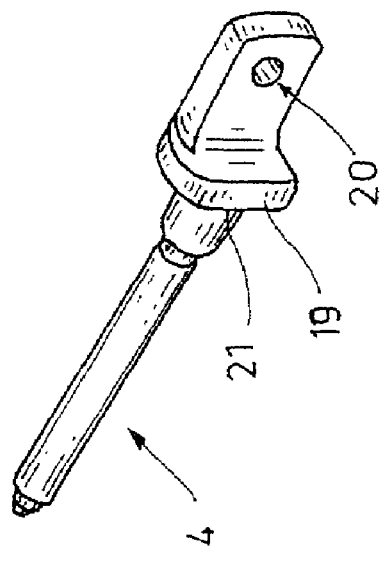
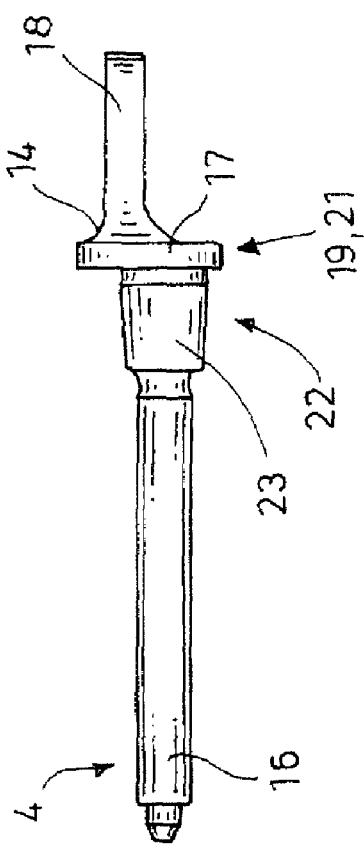

WHEEL SUSPENSION

FIELD OF THE INVENTION

The invention relates to a wheel suspension, which has at least one transverse link and one wheel carrier, with the wheel carrier having a connecting element, through which a bolt extends, for connecting to the transverse link.

BACKGROUND

Wheel suspensions of are known, with a spring link as a transverse link being connected with its connecting end to the wheel carrier. In this example, the wheel carrier may be a fork-shaped design at its connecting element, with bores being arranged in each of its fork limbs, through which is inserted a threaded bolt. The threaded bolt may project beyond the fork limbs in each instance so that a nut can be screwed onto the projecting free ends, such that the spring link is sufficiently fastened or clamped between the two fork limbs by screwing the nuts onto each projecting free end of the threaded bolt.

A key disadvantage of this known type of wheel suspension involves the connection of the spring link to the wheel carrier by means of the insertion of the bolt and screwing at both sides. This process is extremely time-consuming and expensive, and requires a multiplicity of components to be used.

DE 101 08 686 A1 relates to a fastening arrangement of a cardanically pivotable first component of a motor vehicle, in particular of a telescopic shock absorber, to a second component with a defined fastening plane, in particular to a link of a wheel suspension of the motor vehicle. The first component can be fastened to the second component by means of a fastening eye and a rubber-metal sleeve bearing which has a bearing bolt and fastening lugs which are formed thereon. In order to compensate a fastening plane running obliquely with respect to the bearing central axis, the fastening lugs are aligned asymmetrically with respect to the bearing bolt.

DE 197 20 639 A1 likewise discloses a bearing arrangement for a pivotable component, in particular for a link of a wheel suspension for motor vehicles, having a component-side bearing sleeve, having a bearing bolt which projects through the bearing sleeve and has fastening points at the end side, and having a resiliently elastic bearing element which is situated between said bearing sleeve and bearing bolt. At least one of the end-side fastening points is a screw which projects into the bearing bolts and has an eye-shaped head.

DE 38 03 802 discloses a wheel suspension for a driven front axle of a motor vehicle having a stabilizer which is held on the body side and which is connected to a wheel carrier by means of a joint with a hanger and by means of a further joint. The hanger is composed of a curved arm which, between the joints, encompasses a free space for a transversely running wheel driveshaft which runs with a spacing to the arm in the vertical and longitudinal direction. The arm is aligned in the vehicle longitudinal direction. The wheel-carrier-side joint is situated above the wheel rotational axis in a steering axis which is formed by an upper spring strut support bearing and a lower transverse link bearing.

DE 39 09 942 A1 discloses a wheel suspension for the front wheels of a motor vehicle having an upper and a lower transverse link which are articulatedly mounted on a wheel carrier, and having a spring-damper element which is connected to the upper transverse link and is supported on the vehicle body. The spring-damper element is supported between the upper and the lower transverse link on a bearing lever in a bearing. The bearing lever is pivotably held on a transverse link and is guided by means of a control lever which is mounted on the body side.

EP 0 312 711 B1 discloses a wheel suspension for a motor vehicle, in particular a transverse link axle having a damper and spring strut, which is supported at the body side and is connected to an upper transverse link, with an intermediate member being arranged between the wheel carrier and the upper transverse link and fixedly connected to the damper and spring strut. On the one hand, a link is arranged between the intermediate member and the wheel carrier, wherein on the other hand, a bearing arrangement is arranged between the intermediate member and the transverse link. The link and the bearing arrangement are spaced apart from the damper and spring strut axis and are arranged approximately in a plane which is aligned approximately perpendicularly with respect to the damper and spring strut axis.

U.S. Pat. No. 3,819,202 is concerned with a suspension system of a motor vehicle having a wheel camber and toe-in adjustment.

U.S. Pat. No. 4,875,703 and EP 0 312 997 B1 are concerned with a double link suspension which has a transverse stabilizer. The wheel suspension comprises a wheel carrier, a lower transverse link and an extension element which, with a first end, is connected so as to be moveable relative to an upper section of the wheel carrier, with the suspension additionally comprising an upper transverse stabilizer and a shock absorber, with the transverse stabilizer being connected to the extension element.

DE 198 OS 810 A1 discloses a connection element for connecting a torsion stabilizer to a component of a vehicle wheel suspension, with the connection element transmitting forces, and permitting angular movements, between the torsion stabilizer and the component. A first ball joint arrangement is fixedly connected to a second ball joint arrangement. A first end of the first ball joint arrangement is connected to the torsion stabilizer, with the other end being fixedly connected to the one end of the second ball joint arrangement. The other end of the second ball joint arrangement is connected to the component of the wheel suspension.

Although the previously mention patents are solutions, what is needed is a an improved wheel suspension using simple means in such a way that it can be produced in a more cost-effective, simple, and space-saving manner.

SUMMARY OF THE INVENTION

According to the invention, a wheel suspension, comprising at least one transverse link, a wheel carrier having a connecting element with a stop located on a limb of the connecting element, and a bolt having a bolt head with a counterstop is described. The bolt connects the wheel carrier to the at least one transverse link and extends through the connecting element. The bolt counterstop is arranged to correspond to the connecting element stop.

As a result of the counterstop which interacts with the stop, the bolt is fixed in a virtually form-fitting manner at one side, as a result of which the bolt is mounted with its bolt head in a virtually rotationally locked manner. In order to fasten the transverse link to the wheel carrier, it is therefore advantageously necessary merely for a screw to be screwed at one side onto the corresponding bolt end or insertion end.

A form-fitting connection within the context of the invention is a connection in which the two connecting partners bear against one another in a rotationally locked manner with an in each case assigned face. In order that the bolt head can bear in a form-fitting manner against the assigned limb of the connecting element, it is favorably provided that the bolt head has a flange arranged on its contact side which is assigned to the connecting element, on which flange is arranged the counterstop. The flange is expediently of substantially circular design, with the counterstop being recessed out of the flange as a circular section, with the stop being designed as a circular-section-shaped elevation at limbs which are assigned to the bolt head. The stop therefore has a raised base face against which bears a mating base face of the counterstop. It is of course also possible to arrange a counterstop on the flange, which counterstop projects beyond the contact side of the flange in the direction of the connecting element, with the stop of the connecting element in this embodiment being arranged as a circular-section-shaped depression in the associated limb of the connecting element.

It is preferred that the bolt has, on its bolt head, a projection in which is arranged a bore for receiving a wheel carrier end of a coupling strut. This will allow a further suspension element of the wheel suspension to be connected to the wheel carrier. For example, the coupling strut can connect a transverse stabilizer directly to the wheel carrier. For this purpose, the coupling strut is connected by means of its stabilizer end to the transverse stabilizer, with the wheel carrier end of the coupling strut advantageously being articulatedly mounted on the projection.

By implementing this embodiment, the bolt therefore has a dual function. In a first function, the bolt serves to fasten for example the spring link to the wheel carrier. For this purpose, the bolt is placed in contact by means of its bolt head or its counterstop with the stop of the assigned limb of the connecting element, with it being necessary at the other side merely for a single screw or threaded nut to be screwed onto the bolt, so that the spring link, which is referred to by way of example, can be sufficiently fixedly connected or clamped to the wheel carrier. At the same time, the bolt serves, on account of the advantageous design with its projection, to hold a coupling strut in order for example to connect a transverse stabilizer directly to the wheel carrier. It is therefore possible by means of the bolt to connect two suspension elements of the wheel suspension directly to the wheel carrier, wherein the advantageous connecting of the transverse stabilizer to the wheel carrier by means of the coupling strut can favorably influence a toe-in curve or wheel lift curve of the wheel suspension. In addition, the coupling strut can be arranged so as to be inclined or angled running from its wheel carrier end to the stabilizer end. Here, the coupling strut can be inclined in the vehicle longitudinal direction in such a way that its stabilizer end is arranged closer to a vehicle front than its wheel carrier end. In addition, the coupling strut can be arranged so as to be inclined in such a way that its stabilizer end is arranged closer to a vehicle central axis than its wheel carrier end as viewed in the longitudinal direction of the vehicle. Here, the coupling strut runs from its wheel carrier end, which is arranged at the bottom as viewed in the vertical direction of the motor vehicle, to its stabilizer end, which is arranged at the top as viewed in the vertical direction, in at least one spatial angle. However, the coupling strut can of course also connect a transverse stabilizer directly to the wheel carrier without the coupling strut having an angularly arranged profile from its wheel carrier end to its stabilizer end.

In order that the spring link, which is referred to by way of example, can be sufficiently fixedly connected to the wheel carrier, it is expediently provided that the bolt has an insertion end which is situated opposite the bolt head and on which is arranged an external thread. The single threaded nut can be screwed onto the external thread, so that the spring link, which is referred to by way of example, can be sufficiently fixedly connected or clamped to the wheel carrier.

In another preferred embodiment, it is within the context of the invention for the bolt to be formed with a continuous external diameter from its bolt head in the direction of its insertion end, with the insertion end being of frustoconical design. As a result of the frustoconical design of the insertion end, it is ensured that the bolt can be inserted relatively easily into the bores which are arranged in the limbs of the connecting element or in the spring link, which is referred to by way of example. In this embodiment, the interacting stops and counterstops provide rotationally locked mounting of the bolt, in particular during the screwing process. At the same time, it is obtained by means of the form-fitting contact of the bolt head on the connecting element that the projection is arranged in a desired or predefinable installation position with respect to the coupling strut. The required installation position is predefined by the arrangement of the counterstop and of the stop.

In a further advantageous embodiment of the invention, it is advantageously provided that the bolt has, at its bolt head region, a conical thickening which narrows from the bolt head in the direction of an insertion end of the bolt. In this embodiment, the bolt is pulled with its conical thickening into the bore during the screwing process, so that a conical seat is virtually provided. This is favorable in particular when, in an existing wheel suspension, the existing bolt must be replaced for service or repair reasons. If it is to be additionally possible in the existing wheel suspension for the toe-in to be favorably influenced, it is conceivable for the bolt in its embodiment with the conical thickening to have the abovementioned projection on its bolt head, so that for example a transverse stabilizer can be connected by means of the coupling strut directly to the wheel carrier. In order that the projection can then be mounted in a predefined installation position on the wheel suspension or on the wheel carrier, the bolt can of course also have, in addition to the conical thickening, the flange with the counterstop, which can then interact with the corresponding stop on the connecting element. As a result of the advantageous arrangement of the projection on the bolt head, it is therefore possible to dispense with a separate connection, for example a separate welded connection of a projection, which is formed as an individual part, to the wheel carrier or to its connecting element, in order to connect the coupling strut to the wheel carrier.

The bolt can accordingly be formed in different embodiments. On the one hand, in one alternative embodiment, the bolt can have the counterstop, and the projection which is produced in one piece with the bolt, on its bolt head. On the other hand, however, the bolt can have only the conical thickening at its bolt head region, so that it is also ensured here that only a single screw connection is necessary for sufficiently fixing the spring link, which is referred to by way of example, to the wheel carrier. Also conceivable, however, is a combination of the two said types of design, so that, on the one hand, the bolt head has the counterstop, and the projection which is produced in one piece with the bolt or with the bolt head, on its flange, wherein the conical thickening can at the same time be provided in the bolt head region.

In order to connect the spring link to the wheel carrier, it is favorably provided that the connecting element is of fork-shaped design with two fork limbs, in which is formed in each case one bore through which the bolt extends.

Here, the connecting element is favorably produced in one piece with the wheel carrier, with the two fork limbs being substantially flexible, so that, by means of the force-fitting and form-fitting screw connection, said fork limbs are pulled in the direction of the spring link, which is referred to by way of example and is arranged between the two fork limbs, as a result of which sufficient fixing of the spring link can be obtained. At the same time, the bolt can have the advantageous dual function of for example connecting a transverse stabilizer directly to the wheel carrier via a coupling strut. The connection of the spring link, which is referred to by way of example, to the wheel carrier, and of the transverse stabilizer by means of the coupling strut, is therefore combined in one single component. Installation costs are therefore reduced in comparison to the known prior art, as a result of which a required installation space, with additional material such as for example bolts and nuts, is however also reduced.

BRIEF DESCRIPTION OF THE DRAWINGS

Further advantageous embodiments of the invention are disclosed in the subclaims and in the following description of the figures, in which:

FIG. 3 shows a bolt as a detail in different views, FIG. 4 shows the wheel suspension from FIG. 4 without a transverse link, and FIG. 5 shows a bolt as a detail in a further embodiment.

In the various figures, the same parts are always provided with the same reference symbols, so that said parts are generally also described only once.

DETAILED DESCRIPTION OF THE PREFERRED EMBODIMENTS

Figure 1:
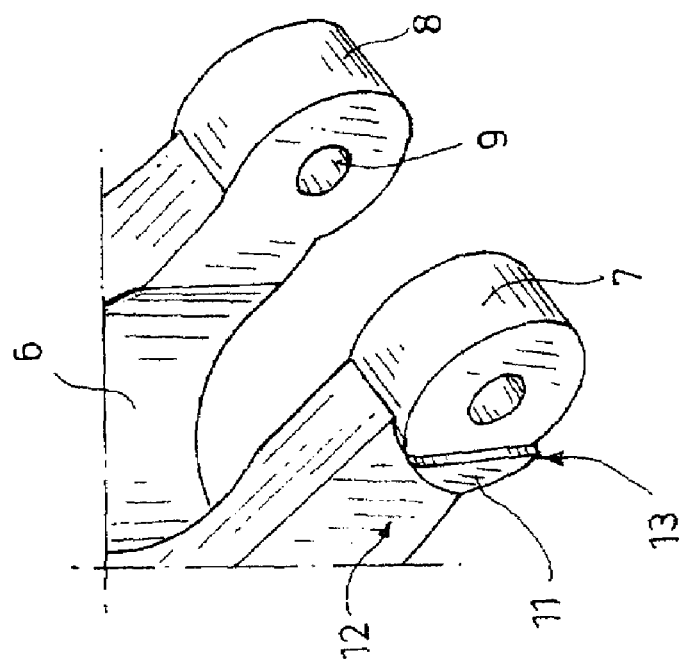
FIG. 1 shows a wheel suspension with a wheel carrier, a transverse link and a transverse stabilizer in a perspective view.

FIG. 1 shows, by way of example, a wheel suspension 1, which has at least one transverse link 2 and one wheel carrier 3. The wheel carrier 3 has a connecting element 6, through which a bolt 4 (FIG. 4) extends, for connecting to the transverse link 2. The wheel suspension 1 which is illustrated by way of example is a rear wheel suspension of a motor vehicle (not illustrated). Further suspension elements of the wheel suspension 1 are also not shown in FIG. 1 for reasons of clarity.

In the illustrated exemplary embodiment, the wheel carrier 3 is formed in one piece with the connecting element 6 from a cast part. The wheel carrier 3 can of course be shaped from a metal sheet.

Figure 2:
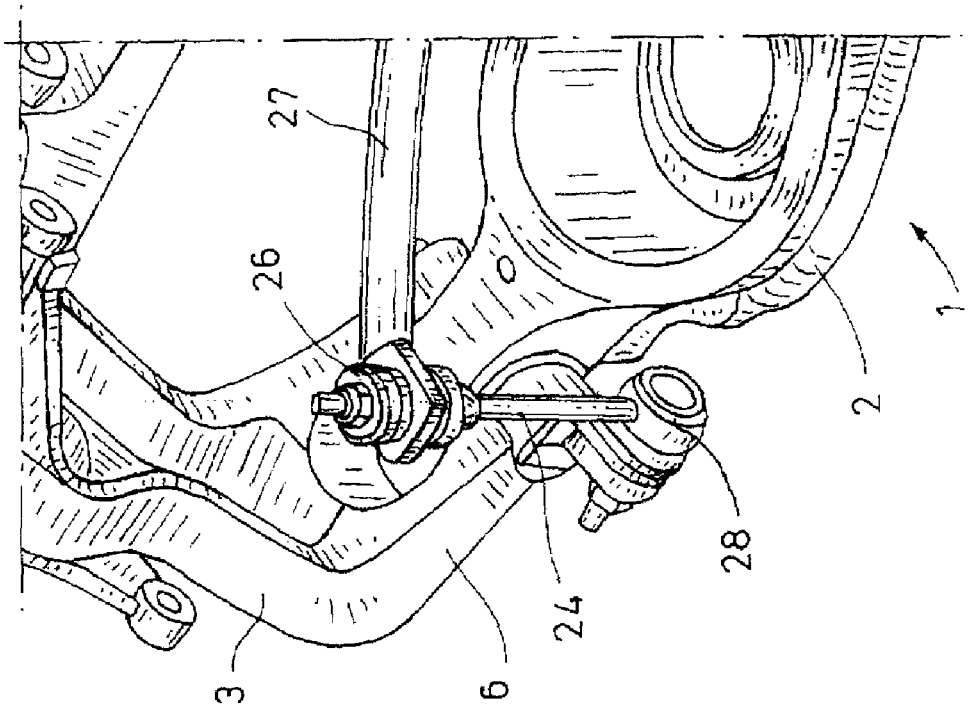
FIG. 2 shows an enlargement of a connecting element of the wheel carrier.

FIG. 2 shows that the connecting element 6 is of fork-shaped design with two fork limbs 7, 8 in which is formed in each case one bore 9 (FIG. 3) through which the bolt 4 extends.

On the left-hand fork limb 7 in the drawing plane, the connecting element 6 has a stop 11.

The stop 11 is formed as a circular-section-shaped elevation and is arranged at an end 12 which points toward the wheel carrier 3. A base face 13 of the stop 11 runs perpendicularly as viewed in a vertical direction. The stop 11 can of course also be arranged in any other suitable position on the fork limb 7, but wherein the base face 13 should in any case be aligned toward the bore 9.

The stop 11 can of course also be arranged as a circular-section-shaped depression on the assigned fork limb 7. In addition, the stop 11 can of course be arranged either on the fork limb 7 or on the opposite fork limb 8. In order to produce the stop 11, the latter can be predefined in the casting mold shape or else mechanically machined.

The bolt 4 which is illustrated by way of example in FIG. 3 has a bolt head 14 and an insertion end 16 which is situated opposite said bolt head 14. The bolt head 14 has a flange 17 which is adjoined by a preferably plate-shaped projection 18. A bore 20 is formed in the projection 18.

The flange 17 is of substantially circular design, with a circular-section-shaped counterstop 19 being recessed out of the flange 17.

The counterstop 19 is of corresponding design to the stop 11, with the counterstop 19 having a mating base face 21 which is of corresponding design to the base face 13 of the stop 11.

The bolt 4 has, at its bolt head region 22, a conical thickening 23 which narrows from the bolt head 14 or from the flange 17 in the direction of its insertion end 16.

Arranged on the insertion end 16 of the bolt 4 is an external thread, so that a nut 24 (FIG. 4) can be screwed onto the insertion end 16. The insertion end 16 is of frustoconical design.

FIG. 4 illustrates the wheel suspension 1 from FIG. 1 without a transverse link 2. FIG. 4 clearly shows that the bolt 4 is mounted with its bolt head 14 on the assigned fork limb 7 so as to be rotationally locked by means of the interacting stops 11 and counterstops 19. The projection 18 can therefore be mounted in a predefined installation position on the wheel suspension 1 or on the wheel carrier 3, so that a coupling strut 24 which, at its stabilizer end 26, supports a transverse stabilizer 27 (FIG. 1) can be connected by means of its wheel carrier end 28 directly to the wheel carrier 3.

In the exemplary embodiment illustrated in FIG. 4 and in FIG. 1, the wheel carrier end 27 of the coupling strut 24 is by way of example assigned a ball-and-socket joint with a threaded bolt 29, so that the threaded bolt 29 can be inserted through the bore 20 in the projection 18, screwed in a force-fitting and form-fitting manner to the projection 18, and therefore connected directly to the wheel carrier 3.

As a result of the advantageous design, the bolt 4 has a dual function. The bolt 4 serves on the one hand for sufficiently fastening the transverse link 2, which is illustrated by way of example and is designed in the illustrated exemplary embodiment as a spring link, and on the other hand for connecting for example the transverse stabilizer 27 to the wheel carrier 3 by means of the coupling strut 24. As a result of the connection of the transverse stabilizer 27 directly to the wheel carrier 3, it is for example possible to favorably influence a toe-in curve of the wheel suspension 1, with it also being possible to provide an angled arrangement (not illustrated) of the coupling strut 24.

FIG. 5 illustrates a further embodiment of the bolt 4. In contrast to the exemplary embodiment illustrated in FIG. 3, the bolt 4 as per the embodiment according to FIG. 5 has no conical thickening 23, but rather a continuous external diameter. The bolt 4 of the embodiment as per FIG. 5 otherwise corresponds to the embodiment as per FIG. 3.

For assembly, the transverse link 2 is initially guided with its connecting end 31 between the two fork limbs 7 and 8. Subsequently or at the same time, the bolt 4 can be inserted through the bores 9, so that the counterstop 19 bears with its mating base face 21 against the stop 11 with its base face 13. The nut 24 is screwed onto the insertion end 16. In this way, the transverse link 2 is sufficiently fixedly connected to the wheel carrier 3 or sufficiently clamped by the two fork limbs 7 and 8. If the bolt 4 has the conical thickening 23, then said thickening is pulled, by means of the screwing of the insertion end 16 with the nut 24, into the fork limb 7, so that a conical seat is virtually formed. Here, the stop 11 and counterstop 19 can likewise come into engagement. The coupling strut 24 can be connected by means of its wheel carrier end 28 to the projection 18, by virtue of the threaded bolt 29 of the exemplary ball-and-socket element being inserted through the bore 19 in the projection and screwed. The transverse stabilizer 27 can already be mounted on the stabilizer end 26.

The bolt 4 therefore has a dual function. On the one hand, the bolt serves for connecting the transverse link 2 to the wheel carrier 3. On the other hand, the coupling strut 24 can be articulatedly mounted on the bolt 4 or on its projection 16 which is preferably produced in one piece with said bolt 4. It is therefore possible to combine a connection of the transverse link 2 or of the exemplary spring link to the wheel carrier 3, and of the transverse stabilizer 27 to the wheel carrier 3 by means of the coupling strut 24, into one single component, that is to say the bolt 4.

The invention claimed is:

1. A wheel suspension comprising:
   at least one transverse link,
   a wheel carrier having a connecting element with a stop located on a limb of the connecting element, a bolt having a bolt head with a counterstop, the bolt connecting the wheel carrier to the at least one transverse link, wherein the bolt extends through the connecting element and the counterstop is arranged to correspond to the connecting element stop;
   a flange arranged on the bolt head, wherein the counterstop is arranged on the flange and the flange abuts the connecting element,
   and
   wherein the flange is of a substantially circular design, with the counterstop being recessed out of the flange as a circular section, and the connecting element stop comprises a circular shaped elevation.

2. The wheel suspension as claimed in claim 1, further comprising the bolt having an insertion end comprising an external thread wherein the insertion end is arranged opposite the bolt head.

3. The wheel suspension as claimed in claim 2, wherein the bolt is formed with a continuous external diameter from its bolt head in the direction of its insertion end, with the insertion end being of frustoconical design.

4. The wheel suspension as claimed in claim 2, wherein the bolt has at its bolt head region, a conical thickening which narrows from the bolt head in the direction of its insertion end.

5. The wheel suspension as claimed in claim 1, wherein the connecting element is of a fork-shaped design with two fork limbs which in each case is formed one bore through which the bolt extends.

6. A wheel suspension comprising:
   at least one transverse link,
   a wheel carrier having a connecting element with a stop located on a limb of the connecting element, a bolt having a bolt head with a counterstop, the bolt connecting the wheel carrier to the at least one transverse link, wherein the bolt extends through the connecting element and the counterstop is arranged to correspond to the connecting element stop;
   a flange arranged on the bolt head, wherein the counterstop is arranged on the flange and the flange abuts the connecting element,
   and
   wherein the bolt head has a projection in which is arranged a bore for receiving a wheel carrier end of a coupling strut.

7. The wheel suspension as claimed in claim 6, further comprising the bolt having an insertion end comprising an external thread wherein the insertion end is arranged opposite the bolt head.

8. The wheel suspension as claimed in claim 7, wherein the bolt is formed with a continuous external diameter from its bolt head in the direction of its insertion end, with the insertion end being of frustoconical design.

9. The wheel suspension as claimed in claim 7, wherein the bolt has at its bolt head region, a conical thickening which narrows from the bolt head in the direction of its insertion end.

10. The wheel suspension as claimed in claim 6, wherein the connecting element is of a fork-shaped design with two fork limbs which in each case is formed one bore through which the bolt extends.

* * * * *